United States Patent
Wu

(10) Patent No.: US 9,794,082 B2
(45) Date of Patent: Oct. 17, 2017

(54) COMMUNICATION DEVICE AND NETWORK CONTROLLER FOR ONLINE TROUBLESHOOTING FOR MBMS IN A WIRELESS COMMUNICATION SYSTEM

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 160 days.

(21) Appl. No.: 14/814,518

(22) Filed: Jul. 31, 2015

(65) Prior Publication Data

US 2016/0037368 A1    Feb. 4, 2016

Related U.S. Application Data

(60) Provisional application No. 62/031,881, filed on Aug. 1, 2014.

(51) Int. Cl.
*H04W 4/00* (2009.01)
*H04L 12/18* (2006.01)

(52) U.S. Cl.
CPC .................. *H04L 12/189* (2013.01)

(58) Field of Classification Search
CPC ..................................... H04L 12/189
See application file for complete search history.

(56) References Cited

U.S. PATENT DOCUMENTS

| | | | |
|---|---|---|---|
| 2013/0010624 A1* | 1/2013 | He | H04L 41/5009 370/252 |
| 2014/0192698 A1* | 7/2014 | Anchan | H04W 4/06 370/312 |
| 2014/0200001 A1* | 7/2014 | Song | H04W 36/0094 455/436 |
| 2017/0055171 A1* | 2/2017 | Keskitalo | H04W 24/10 |

OTHER PUBLICATIONS

3GPP TSG-RAN2 Meeting #86, R2-142913, "Introducing MBSFN measurement by extension of logged measurements", Seoul, Korea, May 19-23, 2014.
3GPP TSG-RAN WG2 Meeting #86, R2-142840, "Introduction of MBMS operations support for E-UTRA", Seoul, Korea, May 19-23, 2014.
3GPP TS 36.300 V12.2.0, Technical Specification, "Evolved Universal Terrestrial Radio Access (E-UTRA) and Evolved Universal Terrestrial Radio Access Network (E-UTRAN)", (Jun. 2014).
3GPP TS 36.331 V12.2.0, Technical Specification, "Evolved Universal Terrestrial Radio Access (E-UTRA)", (Jun. 2014).
3GPP TS 37.320 V12.1.0, Technical Specification, "Universal Terrestrial Radio Access (UTRA) and Evolved Universal Terrestrial Radio Access (E-UTRA)", (Jun. 2014).

* cited by examiner

*Primary Examiner* — Phuc Tran
(74) *Attorney, Agent, or Firm* — CKC & Partners Co., Ltd.

(57) ABSTRACT

A communication device includes a communication interfacing unit and a processor. The processor operable to perform operations includes controlling the communication interfacing unit to transmit a first signal to a network controller according to a user-inputted command; logging first MBSFN measurement results in a first period; and controlling the communication interfacing unit to transmit the logged first MBSFN measurement results to the network controller, so that the network controller adjusts at least one parameter of a network corresponding to a MBSFN transmission of a MBMS signal according to the logged first MBSFN measurement results.

20 Claims, 7 Drawing Sheets

COMMUNICATION DEVICE AND NETWORK CONTROLLER FOR ONLINE TROUBLESHOOTING FOR MBMS IN A WIRELESS COMMUNICATION SYSTEM

RELATED APPLICATIONS

This application claims priority to U.S. Provisional Application Ser. No. 62/031,881, filed Aug. 1, 2014, which is herein incorporated by reference.

BACKGROUND

Technical Field

The present invention relates to a method utilized in a wireless communication system and a communication device thereof. More particularly, the present invention relates to a method for troubleshooting for MBMS in a wireless communication system in a wireless communication system and a communication device thereof.

Description of Related Art

A long-term evolution (LTE) system supporting the 3GPP Rel-8 standard and/or the 3GPP Rel-9 standard are developed by the 3rd Generation Partnership Project (3GPP) as a successor of a universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicating with a core network including a mobility management entity (MME), a serving gateway, etc., for Non-Access Stratum (NAS) control.

An LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

Multimedia broadcast multicast service (MBMS) service or evolved MBMS (E-MBMS) service has been introduced in the UMTS, the LTE system and the LTE-A system, for broadcasting multimedia contents such as TV programs, films, music, etc. Comparing with the traditional unicast, the MBMS service (hereafter referred to both the MBMS service and/or the E-MBMS service) is downlink only, and is broadcasted from the network to multiple (e.g., a specific group of) UEs via a point-to-multipoint transmission. Characteristic of the MBMS service enables the network to provide the MBMS service to unlimited number of UEs with a constant network load. Besides, a UE in the UMTS, the LTE system and/or the LTE-A system can receive the MBMS service inherently, and no additional hardware component is needed to be installed for the MBMS service. Thus, the MBMS service is attractive considering both hardware cost and resource efficiency.

SUMMARY

One aspect of the present disclosure is related to a communication device. In accordance with one embodiment of the present disclosure, the communication device includes a communication interfacing unit and a processor. The communication interfacing unit is configured for receiving a MBMS signal from a network. The processor is electrically connected with the communication interfacing unit. The processor is operable to perform operations including controlling the communication interfacing unit to transmit a first signal to a network controller under a condition that a quality of a MBMS service corresponding to the MBMS signal is lower than a predetermined level; receiving, through the communication interfacing unit, a first log command from the network; logging first MBSFN measurement results according to the first log command in a first period; receiving, through the communication interfacing unit, a first request command from the network; and controlling the communication interfacing unit to transmit the logged first MBSFN measurement results to the network controller according to the first request command, so that the network controller adjusts at least one parameter of the network corresponding to a MBSFN transmission of the MBMS signal according to the logged first MBSFN measurement results.

Another aspect of the present disclosure is related to a communication device. In accordance with one embodiment of the present disclosure, the communication device includes a communication interfacing unit and a processor. The communication interfacing unit is configured for receiving a MBMS signal from a network. The processor is electrically connected with the communication interfacing unit. The processor is operable to perform operations including controlling the communication interfacing unit to transmit a first signal to a network controller according to a user-inputted command; logging first MBSFN measurement results in a first period; and controlling the communication interfacing unit to transmit the logged first MBSFN measurement results to the network controller, so that the network controller adjusts at least one parameter of the network corresponding to a MBSFN transmission of the MBMS signal according to the logged first MBSFN measurement results.

Another aspect of the present disclosure is related to a network controller. In accordance with one embodiment of the present disclosure, the network controller includes a communication interfacing unit and a processor. The communication interfacing unit is configured to communicate with a network. The network transmits a MBMS signal to a communication device. The processor is electrically connected with the communication interfacing unit. The processor is operable to perform operations including receiving, through the communication interfacing unit, a first signal from the communication device; controlling the communication interfacing unit or a network to transmit a first log command to the communication device, so that the communication device logs first MBSFN measurement results according to the first log command in a first period; controlling the communication interfacing unit or a network to transmit a first request command to the communication device, so that the communication device transmits the logged first MBSFN measurement results to the network controller according to the first request command; and adjusting at least one parameter of the network corresponding to a MBSFN transmission of the MBMS signal according to the logged first MBSFN measurement results.

Through an application of one embodiment described above, the quality of the MBMS service can be improved.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
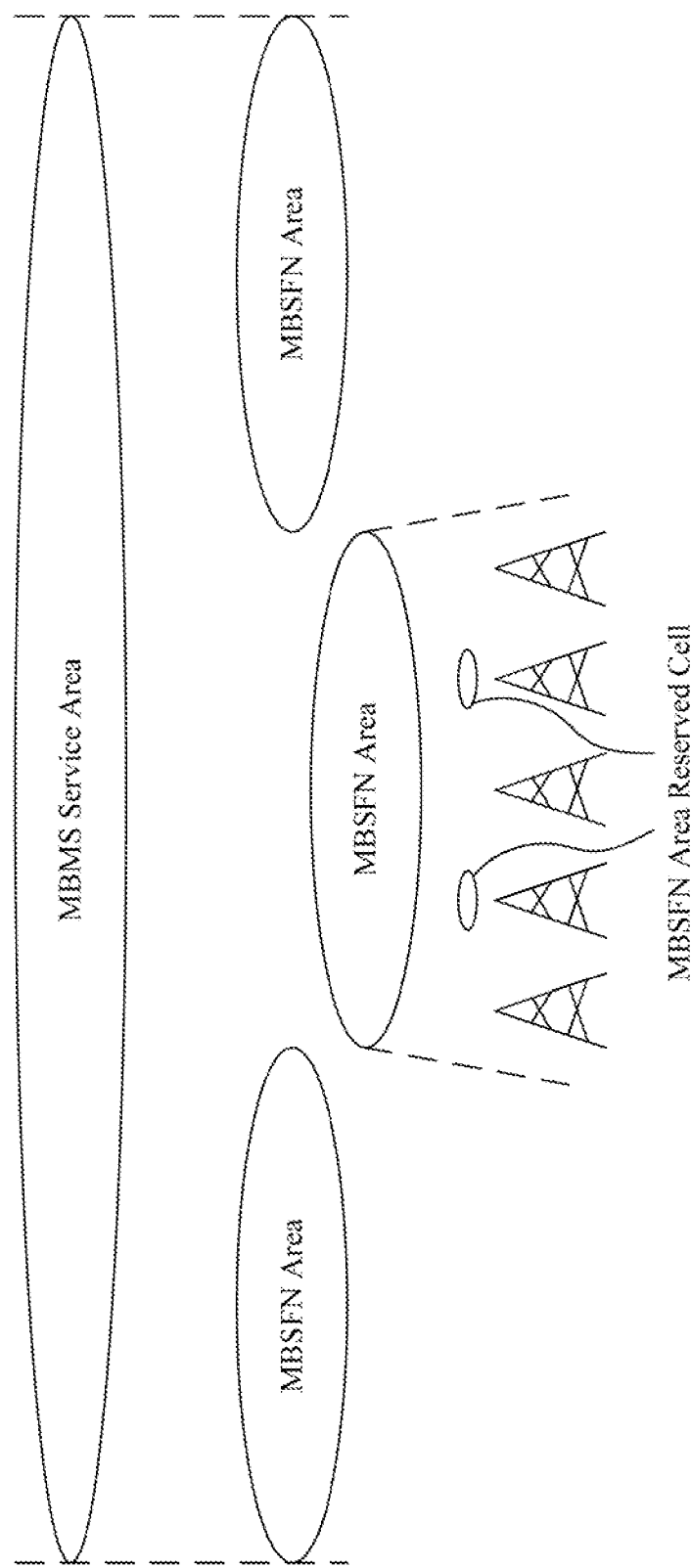
FIG. 1 is a schematic diagram of a MBMS Service Area according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

Any element in a claim that does not explicitly state "means for" performing a specified function, or "step for" performing a specific function, is not to be interpreted as a "means" or "step" clause as specified in 35 U.S.C. §112(f). In particular, the use of "step of" in the claims herein is not intended to invoke the provisions of 35 U.S.C. §112(f).

In the description herein and throughout the claims that follow, the phrase "MBSFN Synchronization Area" indicates an area of the network where all eNBs can be synchronized and perform MBSFN transmissions. MBSFN Synchronization Areas are capable of supporting one or more MBSFN Areas. On a given frequency layer, an eNodeB can only belong to one MBSFN Synchronization Area. MBSFN Synchronization Areas are independent from the definition of MBMS Service Areas.

In the description herein and throughout the claims that follow, the phrase "MBSFN Transmission or a transmission in MBSFN mode" indicates a simulcast transmission technique realized by transmission of identical waveforms at the same time from multiple cells. An MBSFN Transmission from multiple cells within the MBSFN Area is seen as a single transmission by a UE.

In the description herein and throughout the claims that follow, the phrase "MBSFN Area" indicates an MBSFN Area consists of a group of cells within an MBSFN Synchronization Area of a network, which are co-ordinated to achieve an MBSFN Transmission. Except for the MBSFN Area Reserved Cells, all cells within an MBSFN Area contribute to the MBSFN Transmission and advertise its availability. The UE may only need to consider a subset of the MBSFN areas that are configured, i.e. when it knows which MBSFN area applies for the service(s) it is interested to receive.

The descriptions above can be more fully understood with reference made to FIG. 1.

Figure 2:
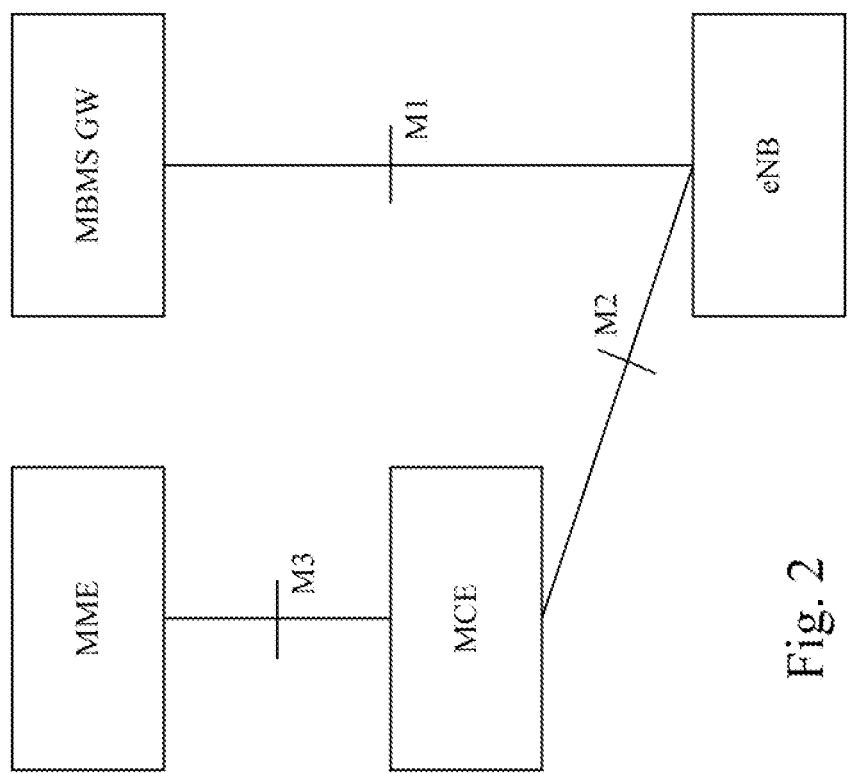
FIG. 2 illustrates Control Plane Interfaces and User Plane Interface in MBMS structure according to one embodiment of the present disclosure.

Reference is now made to FIG. 2. Multi-cell/multicast Coordination Entity (MCE) is a logical entity—this does not preclude the possibility that it may be part of another network element—with the following functions:

- the admission control and the allocation of the radio resources used by all eNBs in the MBSFN area for multi-cell MBMS transmissions using MBSFN operation. The MCE decides not to establish the radio bearer(s) of the new MBMS service(s) if the radio resources are not sufficient for the corresponding MBMS service(s) or may pre-empt radio resources from other radio bearer(s) of ongoing MBMS service(s) according to ARP. Besides allocation of the time/frequency radio resources this also includes deciding the further details of the radio configuration (e.g., the modulation and coding scheme).
- counting and acquisition of counting results for MBMS service(s).
- resumption of MBMS session(s) within MBSFN area(s) based on, for example, the ARP and/or the counting results for the corresponding MBMS service(s).
- suspension of MBMS session(s) within MBSFN area(s) based, for example, the ARP and/or on the counting results for the corresponding MBMS service(s).
- NOTE: In case of distributed MCE architecture, the MCE manages the above functions for a single eNB of a MBSFN. The coordination of the functions between MCEs is provided by OAM, if needed.

The MCE is involved in MBMS Session Control Signalling. The MCE does not perform UE-MCE signalling. An eNB is served by a single MCE.

E-MBMS Gateway (MBMS GW) is a logical entity—this does not preclude the possibility that it may be part of another network element—that is presented between the BMSC and eNBs whose principal functions is the sending/broadcasting of MBMS packets to each eNB transmitting the service. The MBMS GW uses IP Multicast as the means of forwarding MBMS user data to the eNB. The MBMS GW performs MBMS Session Control Signalling (Session start/update/stop) towards the E-UTRAN via MME.

Control Plane Interfaces include the following:
"M3" Interface (MCE-MME): An Application Part is defined for this interface between MME and MCE. This application part allows for MBMS Session Control Signalling on E-RAB level (i.e. does not convey radio configuration data). The procedures include, for example, MBMS Session Start and Stop. SCTP is used as signalling transport i.e. Point-to-Point signalling is applied.

"M2" interface (MCE-eNB): An Application Part is defined for this interface, which conveys at least radio configuration data for the multi-cell transmission mode eNBs and Session Control Signalling. SCTP is used as signalling transport i.e. Point-to-Point signalling is applied.

User Plane Interface includes "M1" Interface (MBMS GW-eNB): This interface is a pure user plane interface. Consequently no Control Plane Application Part is defined for this interface. IP Multicast is used for point-to-multipoint delivery of user packets.

Multicast Broadcast Multimedia Services (MBMS) uses Multicast-Broadcast Single Frequency Network (MBSFN) transmission, where signals from several antennas from potentially different Base Stations are combined in the UE. This combining makes MBSFN transmission different from unicast transmissions, making it difficult to use unicast transmission to verify the performance of MBSFN transmission. MBSFN transmission is unacknowledged. There is no feedback to the RAN such as HARQ or RLC acknowledgements, meaning that the RAN has no knowledge whether transmissions are successfully received or not. Hence, it is difficult for an operator to understand the quality of services MBMS being delivered. Thus, one way to verify and optimize MBSFN radio transmission is to do manual drive test.

However, using manual drive tests for network optimization purposes is costly, contributes in environmental emission of $CO_2$ and more importantly, comes with a limitation to measuring places along a drive route which is generally not typical to where customers consume MBMS services. Hence, it is desirable to have automated solutions, which provide the ability for operators to gather information such as radio measurements which are associated with customer UEs and use this information to assist network operation and optimization.

In the description herein and throughout the claims that follow, the phrase "Minimization of Drive Test (MDT)" indicates logged MDT and immediate MDT have been defined by 3GPP to enable UEs to perform automatic logging and to report logging measurement results to a network. Logged MDT functionality involving measurement logging by UE in IDLE mode, CELL_PCH, URA_PCH states and CELL_FACH state when second DRX cycle is used (when UE is in UTRA) for reporting to eNB/RNC at a later point in time. Logged MDT functionality is further extended to log MBMS/MBSFN measurements by an UE in Idle mode and/or Connected mode.

In logged MDT, a network (e.g., E-UTRAN) configures the UE to perform logging of measurement results while in RRC_IDLE by transmitting a LoggedMeasurementConfiguration message to the UE. The network may retrieve stored MBMS/MBSFN logged measurement results by means of a UE Information procedure. Upon receiving the LoggedMeasurementConfiguration message containing MBMS/MBSFN logging configuration (e.g., targetMBSFN-AreaList as 3GPP R2-142913), the UE performs MBSFN measurements when the UE is receiving a MBMS service.

The UE shall perform the logging in accordance with the following operations:
2>if targetMBSFN-AreaList is included in VarLogMeasConfig:
3>if the UE is camping normally on an E-UTRA cell or is connected to E-UTRA and, if the RPLMN is included in plmn-IdentityList stored in VarLogMeasReport and, if the PCell (in RRC_CONNECTED) or cell where the UE is camping (in RRC_IDLE) is part of the area indicated by areaConfiguration if configured in VarLogMeasConfig:
4>for MBSFN areas, indicated in targetMBSFN-AreaList, from which the UE is receiving MBMS service: perform MBSFN measurements in accordance with the performance requirements as specified in TS 36.133 [16];
NOTE 1: When configured to perform MBSFN measurement logging by targetMBSFN-AreaList, the UE is not required to receive additional MBSFN subframes, i.e. logging is based on the subframes corresponding to the MBMS services the UE is receiving.
4>perform logging at regular time intervals as defined by the loggingInterval in VarLogMeasConfig, but only for those intervals for which MBSFN measurement results are available.
2>else if the UE is camping normally on an E-UTRA cell and if the RPLMN is included in plmn-IdentityList stored in VarLogMeasReport and, if the cell is part of the area indicated by areaConfiguration if configured in VarLogMeasConfig:
3>perform the logging at regular time intervals, as defined by the loggingInterval in VarLogMeasConfig;
2>when adding a logged measurement entry in VarLogMeasReport, include the fields in accordance with the following:
3>set the relativeTimeStamp to indicate the elapsed time since the moment at which the logged measurement configuration was received;
3>if detailed location information became available during the last logging interval, set the content of the locationInfo as follows:
4>include the locationCoordinates;
3>if targetMBSFN-AreaList is included in VarLogMeasConfig:
4>for each MBSFN area, for which measurements results are available during the last logging interval:
5>set the rsrpResultMBSFN, rsrqResultMBSFN, signallingBLER-Result and dataBLER-MCH-ResultList to include measurement results that became available during the last logging interval;
5>set the mbsfn-AreaId and carrierFrequency to indicate the MBSFN area in which the UE is receiving MBSFN transmission.
4>if in RRC_CONNECTED:
5>set the servCellIdentity to indicate global cell identity of the PCell;
5>set the measResultServCell to include the layer 3 filtered measured results of the PCell;
5>if available, set the measResultNeighCells to include the layer 3 filtered measured results of SCell(s) and neighbouring cell(s) measurements that became available during the last logging interval, in order of decreasing RSRP, for at most the following number of cells: 6 intra-frequency and 3 inter-frequency cells per frequency and according to the following:

6>for each cell included, include the optional fields that are available;
5>if available, optionally set the measResultNeighCells to include the layer 3 filtered measured results of neighbouring cell(s) measurements that became available during the last logging interval, in order of decreasing RSCP(UTRA)/RSSI(GERAN)/PilotStrength(cdma2000), for at most the following number of cells: 3 inter-RAT cells per frequency (UTRA, cdma2000)/set of frequencies (GERAN), and according to the following:
6>for each cell included, include the optional fields that are available;
4>if in RRC_IDLE:
5>set the servCellIdentity to indicate global cell identity of the serving cell;
5>set the measResultServCell to include the quantities of the serving cell;
5>if available, set the measResultNeighCells, in order of decreasing ranking-criterion as used for cell re-selection, to include neighbouring cell measurements that became available during the last logging interval for at most the following number of neighbouring cells: 6 intra-frequency and 3 inter-frequency neighbours per frequency and according to the following:
6>for each neighbour cell included, include the optional fields that are available;
5>if available, optionally set the measResultNeighCells to include the layer 3 filtered measured results of neighbouring cell(s) measurements that became available during the last logging interval, in order of decreasing ranking-criterion as used for cell re-selection, for at most the following number of cells: 3 inter-RAT cells per frequency (UTRA, cdma2000)/set of frequencies (GERAN), and according to the following:
6>for each cell included, include the optional fields that are available;
3>else:
4>set the servCellIdentity to indicate global cell identity of the cell the UE is camping on;
4>set the measResultServCell to include the quantities of the cell the UE is camping on;
4>if available, set the measResultNeighCells, in order of decreasing ranking-criterion as used for cell re-selection, to include neighbouring cell measurements that became available during the last logging interval for at most the following number of neighbouring cells: 6 intra-frequency and 3 inter-frequency neighbours per frequency as well as 3 inter-RAT neighbours, per frequency/set of frequencies (GERAN) per RAT and according to the following:
5>for each neighbour cell included, include the optional fields that are available;
NOTE 2: The UE includes the latest results of the available measurements as used for cell reselection evaluation in RRC_IDLE or as used for evaluation of reporting criteria or for measurement reporting according to 5.5.3 in RRC_CONNECTED, which are performed in accordance with the performance requirements as specified in TS 36.133 [16].
2>when the memory reserved for the logged measurement information becomes full, stop timer T330 and perform the same actions as performed upon expiry of T330;

The LoggedMeasurementConfiguration message is used by E-UTRAN to configure the UE to perform logging of measurement results while in RRC_IDLE and to perform logging of measurement results for MBSFN while in both RRC_IDLE and RRC_CONNECTED. It is used to transfer the logged measurement configuration for network performance optimization, see TS 37.320.

The UEInformationResponse message is used by the UE to transfer the information requested by the E-UTRAN.

The MDT functionality described above is useful, convenient and cost saving for an operator to collect measurements and related information from a plurality of subscribers' UEs so the operator's network can analyze the collected measurements to optimize capacity or coverage of the operators' network in order to provide a better service. However, a subscriber may still complain quality of video transmitted by a MBMS service is not good (e.g., unclear video frames) in the subscriber's location.

Figure 3:
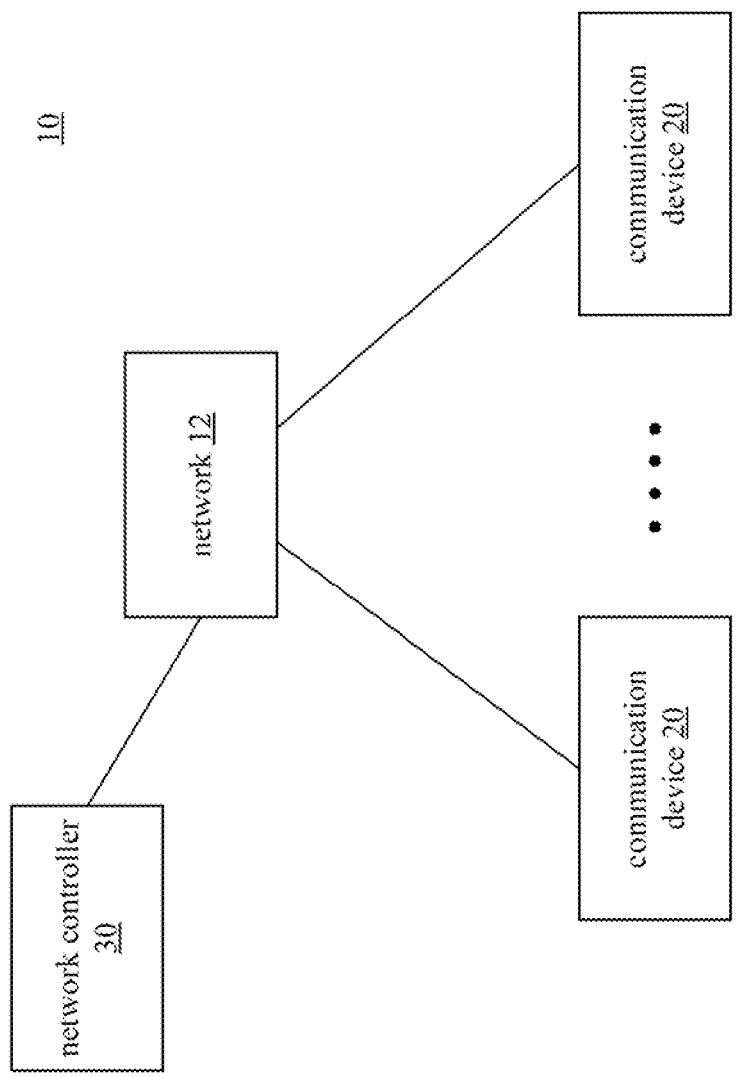
FIG. 3 is a schematic diagram of a wireless communication system according to one embodiment of the present disclosure.

Reference is made to FIG. 3, which is a schematic diagram of a wireless communication system 10 according to one embodiment of the present disclosure. In one embodiment, the wireless communication system 10 includes a network 12, a network controller 30, and a plurality of communication devices 20. In FIG. 1, the network 12, the network controller 30, and the communication devices 20 are simply utilized for illustrating the structure of the wireless communication system 10, and the present disclosure is not limited to such an embodiment. In one embodiment, the network controller 30 and the communication devices 20 are connected to the network 12. In one embodiment, the network 12 can be a universal terrestrial radio access network (UTRAN) including a plurality of Node-Bs (NBs) in a universal mobile telecommunications system (UMTS). Alternatively, the network 12 can be an evolved UTRAN (E-UTRAN) including a plurality of evolved NBs (eNBs) and/or relays in a long term evolution (LTE) system or a LTE-Advanced (LTE-A) system.

In one embodiment, the network 12 can also include both the UTRAN/E-UTRAN and a core network, in which the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network 12 receives information transmitted by one of the communication device 20, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network.

Figure 4:
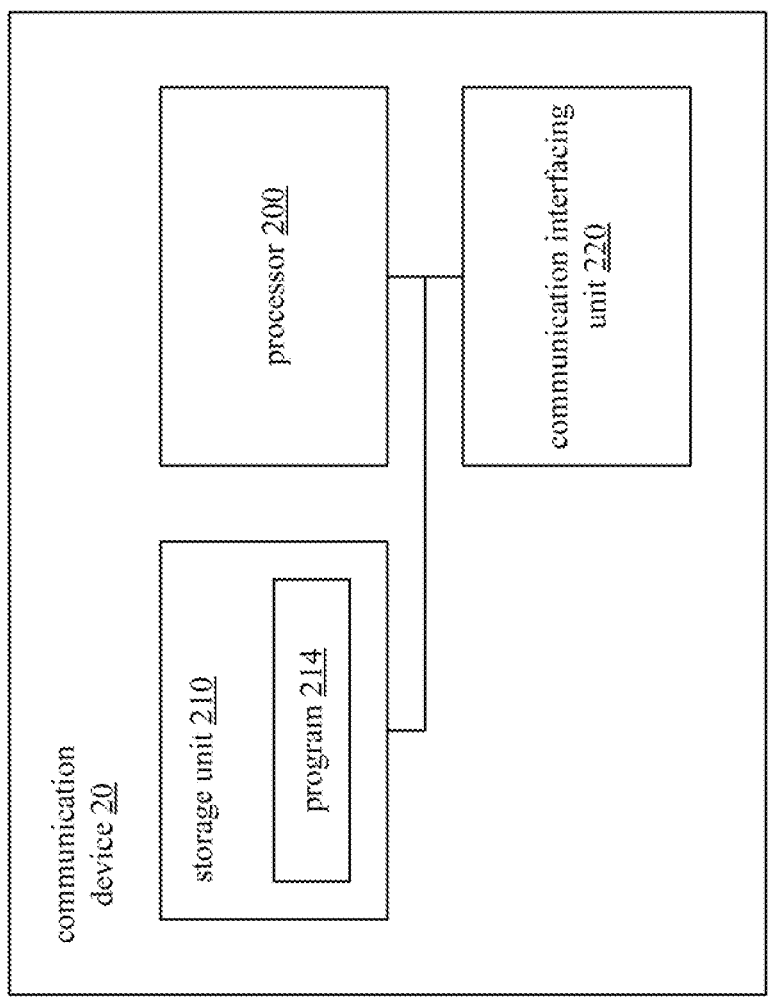
FIG. 4 is a schematic diagram of a communication device according to one embodiment of the present disclosure.

Reference is made to FIG. 4, which is a schematic diagram of one of the communication device 20 according to one embodiment of the present disclosure. In one embodiment, the communication device 20 may be a UE described above. In one embodiment, the communication device 20 may include a processor 200, a storage unit 210, and a communication interfacing unit 220. In one embodiment, the processor 200, the storage unit 210, and the communication interfacing unit 220 are electrically connected to each other. In one embodiment, the processor 200 may be a microprocessor or an Application Specific Integrated Circuit (ASIC), but is not limited in this regard. In one embodiment, the storage unit 210 may be any data storage device that can store a program code (e.g., the program 214) which can be accessed and executed by the processor 200. In one embodiment, the storage unit 210 may be, for example, a read-only memory (ROM), a magnetic tape, a hard disk, and an optical data storage device, but is not limited in this regard. In one embodiment, the communication interfacing unit 220 may be a transceiver and is used to transmit and receive signals (e.g., messages or packets), in some embodiments, the communication interfacing unit 220 may transmit signals according to processing results of the processor 200.

Figure 5:
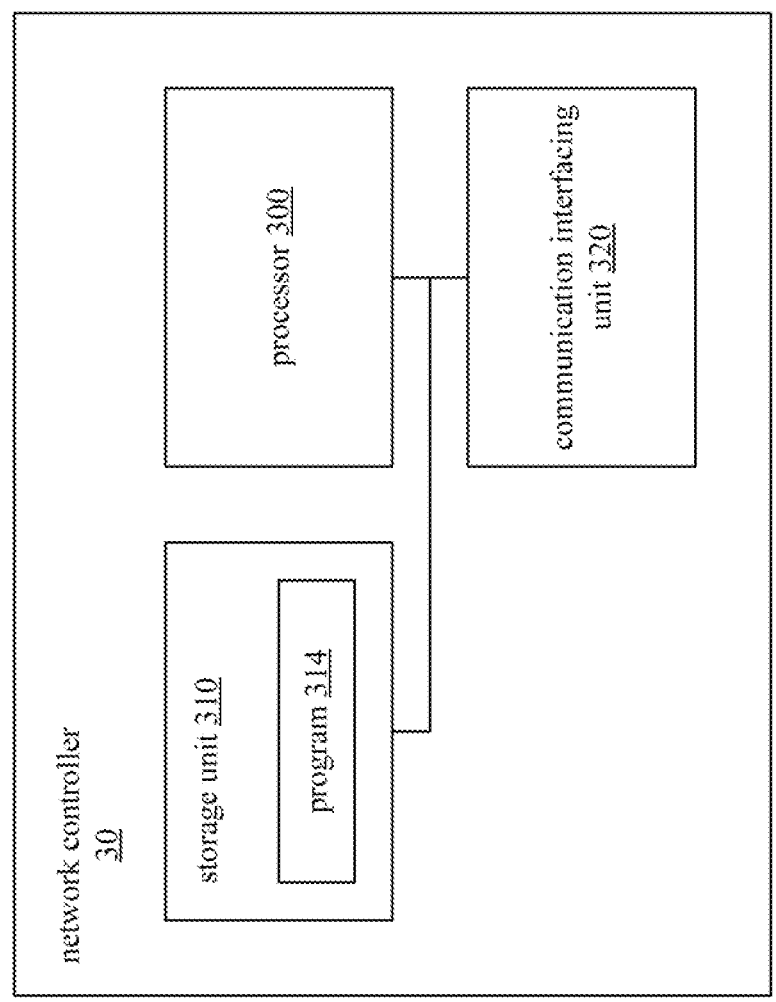
FIG. 5 is a schematic diagram of a network controller according to one embodiment of the present disclosure.

Reference is made to FIG. 5, which is a schematic diagram of the network controller 30 according to one embodiment of the present disclosure. In one embodiment, the network controller 30 may be a computer, a tablet computer, or a smart phone, but is not limited in this regard. In one embodiment, the network controller 30 may include a processor 300, a storage unit 310, and a communication interfacing unit 320. In one embodiment, the processor 300, the storage unit 310, and the communication interfacing unit 320 are electrically connected to each other. In one embodiment, the processor 300 may be a central processor, a microprocessor or an Application Specific Integrated Circuit (ASIC), but is not limited in this regard. In one embodiment, the storage unit 310 may be any data storage device that can store a program code (e.g., the program 314) which can be accessed and executed by the processor 300. In one embodiment, the storage unit 310 may be, for example, a read-only memory (ROM), a magnetic tape, a hard disk, and an optical data storage device, but is not limited in this regard. In one embodiment, the communication interfacing unit 320 may be a transceiver and is used to transmit and receive signals (e.g., messages or packets). In some embodiments, the communication interfacing unit 320 may transmit signals according to processing results of the processor 300.

In one embodiment, the communication device 20 is configured to receive a MBMS service by receiving a MBMS signal (by using a MBSFN communication), collect certain information corresponding to MBSFN communication, and return these information to the network controller 30. The network controller 30 is configured to adjust at least one parameter of the network 12 to improve the quality of the MBMS service received by the communication device 20.

In the paragraphs below, details of communication device 20 and the network controller 30 will be described with reference to FIGS. 6 and 7, but the present disclosure is not limited to the embodiment below.

Figure 6:
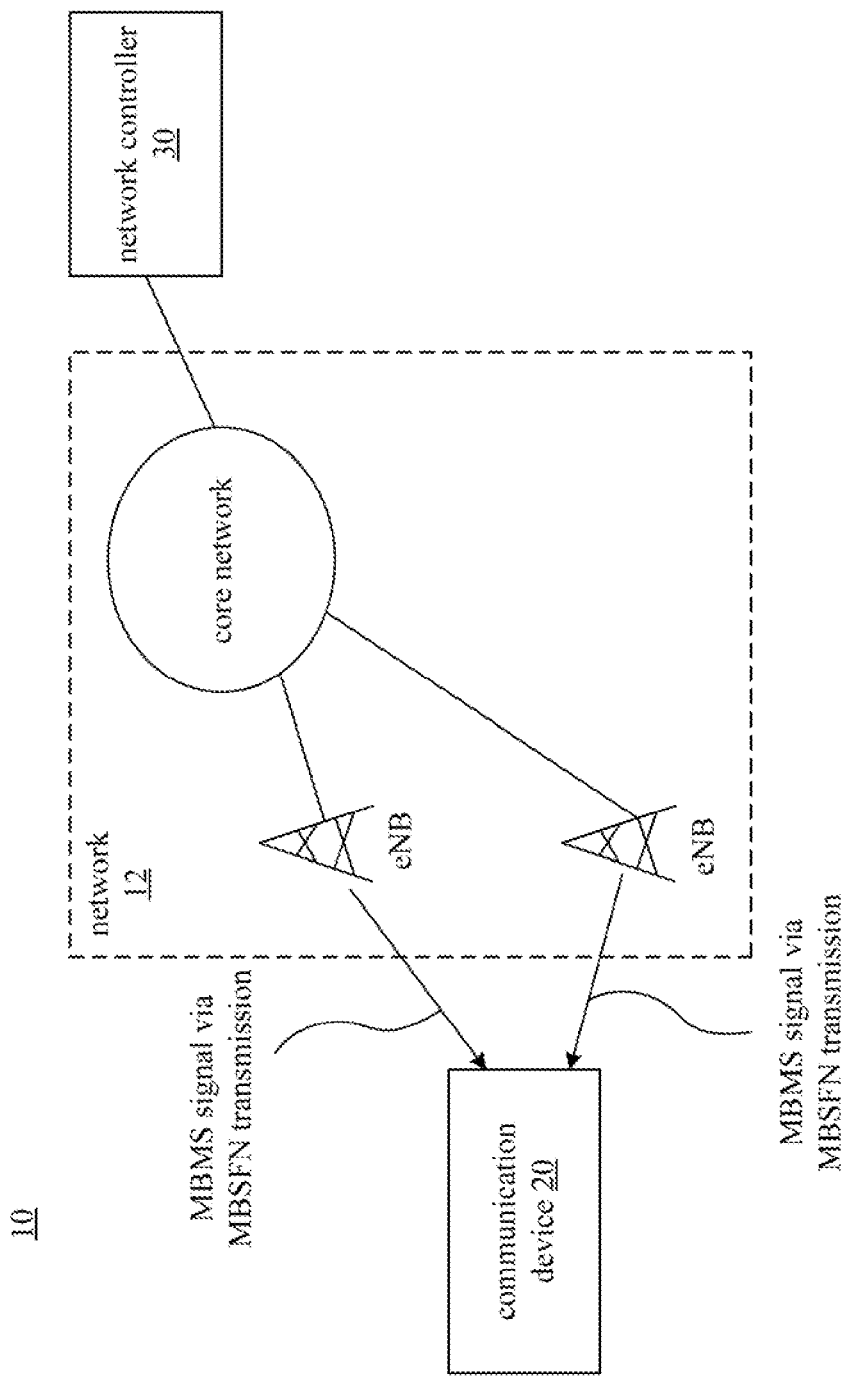
FIG. 6 is a schematic diagram of a wireless communication system according to one embodiment of the present disclosure.

Particular reference is made to FIG. 6, which is a schematic diagram of the wireless communication system 10 according to one embodiment of the present disclosure. In this embodiment, the network 12 includes a core network and a plurality of eNBs. The eNBs are configured to transmit MBMS signals to the communication device 20 via a MBSFN transmission. The network controller 30 is configured to control at least one parameter of the core network and the eNBs.

Figure 7:
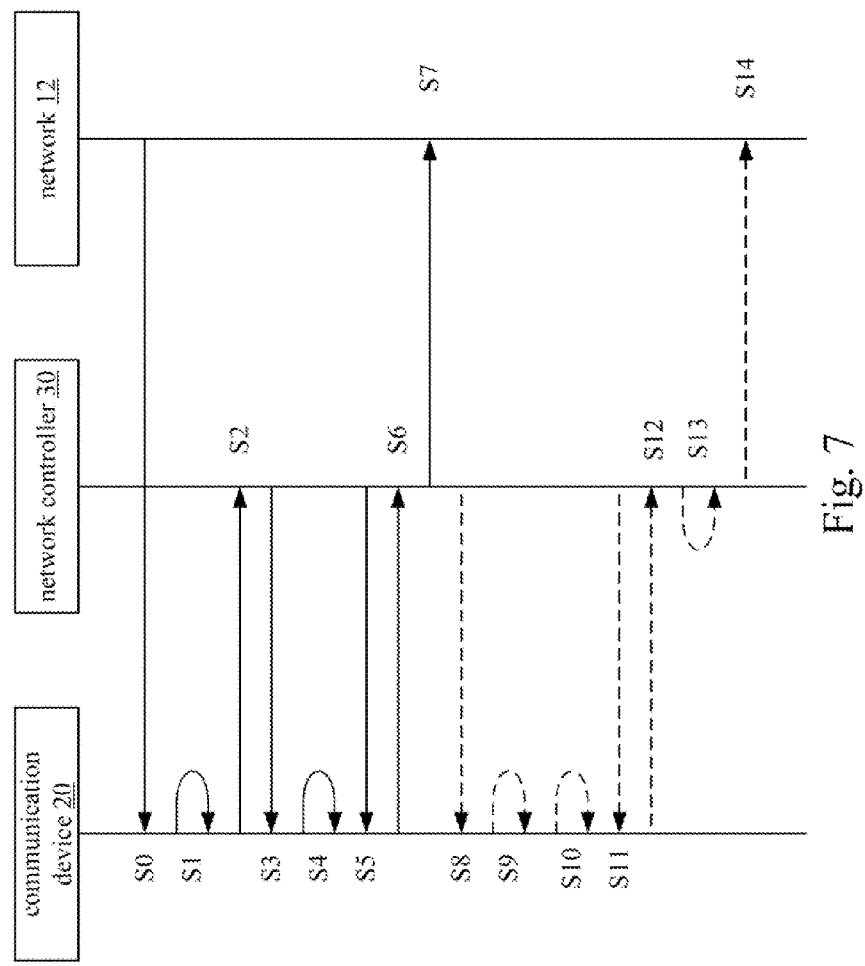
FIG. 7 illustrates operations of the wireless communication system according to one embodiment of the present disclosure.

Reference is also made to FIG. 7, which illustrates operations of the wireless communication system 10 according to one embodiment of the present disclosure. It should be noted that, the operations of the communication device 20 described below may be performed by the processor 200 in executing the program 214 stored in the storage unit 210, and the operations of the network controller 30 described below may be performed by the processor 300 in executing the program 314 stored in the storage unit 310.

It should be noted that in the following operations, no particular sequence is required unless otherwise specified. Moreover, the following operations also may be performed simultaneously or the execution times thereof may at least partially overlap.

Furthermore, the steps of the following operations may be added to, replaced, and/or eliminated as appropriate, in accordance with various embodiments of the present disclosure.

In operation S0, the network 12 transmits MBMS signals to the communication device 20 through the eNBs via a MBSFN transmission, so that the communication device 20 receives a MBMS service corresponding to the MBMS signal via the communication interfacing unit 220.

In operation S1, in one embodiment, after the communication device 20 receives the MBMS service, the processor 200 of the communication device 20 determines whether a quality of the MBMS service is lower than a predetermined level.

In one embodiment, when a signal strength of one of the MBMS signals is lower than a predetermined threshold, the processor 200 of the communication device 20 may determine the quality of the MBMS service is lower than the predetermined level. In this embodiment, the quality of the MBMS service corresponding to the MBMS signal indicates a signal strength of one of the MBMS signals.

In another embodiment, when a block error rate of one of the MBMS signals is greater than another predetermined threshold, the processor 200 of the communication device 20 determines the quality of the MBMS service is lower than the predetermined level. In this embodiment, the quality of the MBMS service corresponding to the MBMS signal indicates a block error rate of one of the MBMS signals.

In one embodiment, under a condition that the quality of the MBMS service is not lower than the predetermined level, operation S1 is continuously performed.

In one different embodiment, after the communication device 20 receives the MBMS service, the processor 200 of the communication device 20 may determine whether a certain user-inputted command is received. In such an embodiment, under a condition that the user-inputted command is not received, operation S1 is continuously performed. In one embodiment, the user-inputted command may be received through a touch display (not shown) of the communication device 20 or another suitable user input interface.

In operation S2, under a condition that the quality of the MBMS service is lower than the predetermined level or the processor 200 of the communication device 20 receives the user-inputted command, the processor 200 of the communication device 20 controls the communication interfacing unit 220 to transmit a first signal to the network controller 30 via the network 12.

In operation S3, after the network controller 30 receives the first signal through the communication interfacing unit 320 via the network 12, the processor 300 of the network controller 30 controls the communication interfacing unit 320 to transmit a first log command to the communication device 20 via the network 12 or controls the network 12 to transmit the first log command to the communication device 20. In one embodiment, the first log command may be the LoggedMeasurementConfiguration message described above.

In operation S4, after the communication device 20 receives the first log command through the communication interfacing unit 220 from the network 12, the processor 200 of the communication device 20 logs first MBSFN measurement results corresponding to the MBSFN transmission according to the first log command in a first period. In one embodiment, the logged first MBSFN measurement results may be stored in the storage unit 210.

In one embodiment, the first MBSFN measurement results includes at least one of a RSRP measured in at least one of MBSFN subframes, a RSRQ measured the at least one of MBSFN subframes, a signalingBLER-Result, a dataBLER-MCH-Result, and a MBSFN Area ID, but is not limited in this regard.

In one embodiment, the first MBSFN measurement results includes at least one of an absoluteTimeStamp-r10, a traceReference-r10, a tce-Id-r10, a locationInfo-r10, a relativeTimeStamp-r10, a servCellIdentity-r10, a measResultServCell-r10, a measResultNeighCells-r10, and a measResultListEUTRA-v1090, but is not limited in this regard.

In one embodiment, before the processor 200 of the communication device 20 logs the first MBSFN measurement results corresponding to the MBSFN transmission, a user's consent should be obtained.

In one embodiment, during logging the first MBSFN measurement results corresponding to the MBSFN transmission, the communication device 20 keeps receiving the MBMS service.

It should be noted that details of the logging can be ascertained with reference to the paragraphs above, and a description in this regard will not be repeated.

In operation S5, after the first log command is transmitted for a predetermined time (e.g., couples of minutes), the processor 300 of the network controller 30 controls the communication interfacing unit 320 to transmit a first request command to the communication device 30 via the network 12 or requests the network 12 to transmit the first request command to the communication device 30. In one embodiment, the first request command may be the UEInformationRequest message described above.

In operation S6, after the communication device 20 receives the first request through the communication interfacing unit 220 from the network 12, the processor 200 of the communication device 20 controls the communication interfacing unit 220 to transmit the logged first MBSFN measurement results to the network controller 30 via the network 12.

In operation S7, after the network controller 30 receives the logged first MBSFN measurement results through the communication interfacing unit 320 via the network 12, the processor 300 of the network controller 30 controls the communication interfacing unit 320 to transmit a control signal to the network 12 to adjust at least one parameter of the network 12 corresponding to the MBSFN transmission of the MBMS signals according to the logged first MBSFN measurement results.

In one embodiment, the processor 300 of the network controller 30 may adjust the at least one parameter to adjust a transmission power of the MBSFN transmission of at least one of the eNBs in the network 12 for the MBMS signals, so as to strengthen a transmission power of the MBSFN transmission of at least one of the MBMS signals. In this embodiment, the at least one parameter of the network corresponding to the MBSFN transmission of the MBMS signal includes a transmission power of the MBSFN transmission for the MBMS signal.

In another embodiment, the processor 300 of the network controller 30 may adjust the at least one parameter to adjust a transmission direction (e.g., adjust an antenna orientation) of the MBSFN transmission of at least one of the eNBs in the network 12 for the MBMS signals, so as to adjust a transmission direction of the MBSFN transmission of at least one of the MBMS signals. In this embodiment, the at least one parameter of the network corresponding to the MBSFN transmission of the MBMS signal includes a transmission direction of the MBSFN transmission for the MBMS signal.

It should be noted that, the adjustments of the network 12 is not limited to the embodiment above, other adjustments are within the contemplated scope of the present disclosure.

Through the operations described above, the quality of the MBMS service can be improved.

In some embodiments, the operations of the wireless communication system 10 may further includes operations S8-S14, but these operations may be selectively omitted on a basis of actual requirements.

In operation S8, after at least one parameter of the network 12 corresponding to the MBSFN transmission of the MBMS signals is adjusted, the processor 300 of the network controller 30 controls the communication interfacing unit 320 to transmit a second log command to the communication device 20 via the network 12 or controls the network to transmit the second log command to the communication device 20. In one embodiment, the second log command may be the LoggedMeasurementConfiguration message described above.

In operation S9, after the communication device 20 receives the second log command through the communication interfacing unit 220 from the network 12, the processor 200 of the communication device 20 clears the logged first MBSFN measurement results in the storage unit 210. In some embodiment, the operation S9 may be omitted.

In operation S10, after the communication device 20 receives the second log command through the communication interfacing unit 220 from the network 12, the processor 200 of the communication device 20 logs second MBSFN measurement results corresponding to the MBSFN transmission according to the second log command in a second period different from the first period. In one embodiment, the logged second MBSFN measurement results may be stored in the storage unit 210.

In one embodiment, the second MBSFN measurement results includes at least one of a RSRP measured in at least one of MBSFN subframes, a RSRQ measured the at least one of MBSFN subframes, a signalingBLER-Result, a dataBLER-MCH-Result, and a MBSFN Area ID, but is not limited in this regard.

In one embodiment, the second MBSFN measurement results includes at least one of an absoluteTimeStamp-r10, a traceReference-r10, a tce-Id-r10, a locationInfo-r10, a relativeTimeStamp-r10, a servCellIdentity-r10, a measResultServCell-r10, a measResultNeighCells-r10, and a measResultListEUTRA-v1090, but is not limited in this regard.

In one embodiment, during logging the second MBSFN measurement results corresponding to the MBSFN transmission, the communication device 20 keeps receiving the MBMS service.

It should be noted that details of the logging can be ascertained with reference to the paragraphs above, and a description in this regard will not be repeated.

In operation S11, after the second log command is transmitted for another predetermined time (e.g., couples of minutes), the processor 300 of the network controller 30 controls the communication interfacing unit 320 to transmit a second request command to the communication device 30 via the network 12 or controls the network 12 to transmit the second request command to the communication device 30. In one embodiment, the second request command may be the UEInformationRequest message described above. If the operation S9 is omitted, the second request command will be transmitted in a predetermined time (e.g., couples of minutes) after the at least one parameter of the network 12 corresponding to the MBSFN transmission of the MBMS signals is adjusted.

In operation S12, after the communication device 20 receives the second request through the communication interfacing unit 220 from the network 12, the processor 200 of the communication device 20 controls the communication interfacing unit 220 to transmit the logged second MBSFN measurement results to the network controller 30 via the network 12.

In operation S13, after the network controller 30 receives the logged second MBSFN measurement results through the communication interfacing unit 320 via the network 12, the processor 300 of the network controller 30 determines whether the quality of the MBMS service received by the communication device 20 is improved to an acceptable level according to the logged second MBSFN measurement results. If so, the process is terminated. If not, operation S14 is performed.

In operation S14, under a condition that the quality of the MBMS service received by the communication device 20 is not improved to the acceptable level, the processor 300 of the network controller 30 controls the communication interfacing unit 320 to transmit another control signal to the network 12 to adjust at least one parameter of the network 12 corresponding to the MBSFN transmission of the MBMS signals according to the logged first MBSFN measurement results and the logged second MBSFN measurement results.

It should be noted that the adjustments of the network 12 can be ascertained with reference to the paragraphs above, and a description in this regard will not be repeated herein.

Through the operations described above, the quality of the MBMS service can be improved.

It should be noted that, in some embodiments, the communication device 20 and the network controller 30 may communicate with each other without using the network 12. In such embodiments, all of the signals, commands, and measurement results transmitted between the communication device 20 and the network controller 30 described above may be directly or indirectly sent without being transmitted via the network 12. Thus, the present disclosure is not limited to the embodiment above.

Although the present invention has been described in considerable detail with reference to certain embodiments thereof, other embodiments are possible. Therefore, the scope of the appended claims should not be limited to the description of the embodiments contained herein.

What is claimed is:

1. A communication device comprising:
a communication interfacing unit configured for receiving a MBMS signal from a network; and
a processor electrically connected with the communication interfacing unit, the processor operable to perform operations comprising:
controlling the communication interfacing unit to transmit a first signal to a network controller under a condition that a quality of a MBMS service corresponding to the MBMS signal is lower than a predetermined level;
receiving, through the communication interfacing unit, a first log command from the network after transmitting the first signal;
logging first MBSFN measurement results according to the first log command in a first period;
receiving, through the communication interfacing unit, a first request command from the network; and
controlling the communication interfacing unit to transmit the logged first MBSFN measurement results to the network controller according to the first request command, so that the network controller adjusts at least one parameter of the network corresponding to a MBSFN transmission of the MBMS signal according to the logged first MBSFN measurement results.

2. The communication device as claimed in claim 1, wherein the quality of the MBMS service corresponding to the MBMS signal is a signal strength of the MBMS signal.

3. The communication device as claimed in claim 1, wherein the quality of the MBMS service corresponding to the MBMS signal is a block error rate of the MBMS signal.

4. The communication device as claimed in claim 1, wherein the at least one parameter of the network corresponding to the MBSFN transmission of the MBMS signal comprises a transmission power of the MBSFN transmission for the MBMS signal.

5. The communication device as claimed in claim 1, wherein the at least one parameter of the network corresponding to the MBSFN transmission of the MBMS signal comprises a transmission direction of the MBSFN transmission for the MBMS signal.

6. The communication device as claimed in claim 1, wherein the operations comprises:
receiving, through the communication interfacing unit, a second log command from the network;
logging second MBSFN measurement results according to the first log command in a second period different from the first period;
receiving, through the communication interfacing unit, a second request command from the network; and
controlling the communication interfacing unit to transmit the logged second MBSFN measurement results to the network controller according to the second request command.

7. The communication device as claimed in claim 1, wherein the first MBSFN measurement results or the second MBSFN measurement results comprises at least one of a RSRP measured in at least one of MBSFN subframes, a RSRQ measured the at least one of MBSFN subframes, a signalingBLER-Result, a dataBLER-MCH-Result, and a MBSFN Area ID.

8. The communication device as claimed in claim 1, wherein the first MBSFN measurement results or the second MBSFN measurement results comprises at least one of an absoluteTimeStamp-r10, a traceReference-r10, a tce-Id-r10, a locationInfo-r10, a relativeTimeStamp-r10, a servCellIdentity-r10, a measResultServCell-r10, a measResultNeighCells-r10, and a measResultListEUTRA-v1090.

9. A communication device comprising:
a communication interfacing unit configured for receiving a MBMS signal from a network;
a processor electrically connected with the communication interfacing unit, the processor operable to perform operations comprising:
controlling the communication interfacing unit to transmit a first signal to a network controller according to a user-inputted command;
receiving, through the communication interfacing unit, a first log command from the network, after transmitting the first signal;
logging first MBSFN measurement results in a first period; and
controlling the communication interfacing unit to transmit the logged first MBSFN measurement results to the network controller, so that the network controller adjusts at least one parameter of the network corresponding to a MBSFN transmission of the MBMS signal according to the logged first MBSFN measurement results.

10. The communication device as claimed in claim 9, wherein the at least one parameter comprises a transmission power of the MBSFN transmission for the MBMS signal.

11. The communication device as claimed in claim 9, wherein the at least one parameter of the network corresponding to the MBSFN transmission of the MBMS signal comprises a transmission direction of the MBSFN transmission for the MBMS signal.

12. The communication device as claimed in claim 9, wherein the operations comprises:
    logging second MBSFN measurement results in a second period different from the first period; and
    controlling the communication interfacing unit to transmit the logged second MBSFN measurement results to the network controller.

13. The communication device as claimed in claim 9, wherein the first MBSFN measurement results or the second MBSFN measurement results comprises at least one of a RSRP measured in at least one of MBSFN subframes, a RSRQ measured the at least one of MBSFN subframes, a signalingBLER-Result, a dataBLER-MCH-Result, and a MBSFN Area ID.

14. The communication device as claimed in claim 9, wherein the first MBSFN measurement results or the second MBSFN measurement results comprises at least one of an absoluteTimeStamp-r10, a traceReference-r10, a tce-Id-r10, a locationInfo-r10, a relativeTimeStamp-r10, a servCellIdentity-r10, a measResultServCell-r10, a measResultNeighCells-r10, and a measResultListEUTRA-v1090.

15. A network controller comprising:
    a communication interfacing unit configured to communicate with a network, wherein the network transmits a MBMS signal to a communication device; and
    a processor electrically connected with the communication interfacing unit, the processor operable to perform operations comprising:
        receiving, through the communication interfacing unit, a first signal from the communication device;
        controlling the communication interfacing unit or a network to transmit a first log command to the communication device after transmitting the first signal, so that the communication device logs first MBSFN measurement results according to the first log command in a first period;
        controlling the communication interfacing unit or the network to transmit a first request command to the communication device, so that the communication device transmits the logged first MBSFN measurement results to the network controller according to the first request command; and
        adjusting at least one parameter of the network corresponding to a MBSFN transmission of the MBMS signal according to the logged first MBSFN measurement results.

16. The network controller as claimed in claim 15, wherein
    the at least one parameter of the network corresponding to a MBSFN transmission of the MBMS signal comprises a transmission power of the MBSFN transmission for the MBMS signal.

17. The network controller as claimed in claim 15, wherein the at least one parameter of the network corresponding to a MBSFN transmission of the MBMS signal comprises a transmission direction of the MBSFN transmission for the MBMS signal.

18. The network controller as claimed in claim 15, wherein the operations comprises:
    controlling the communication interfacing unit or a network to transmit a second log command to the communication device, so that the communication device logs second MBSFN measurement results according to the second log command in a second period different from the first period; and
    controlling the communication interfacing unit or the network to transmit a second request command to the communication device, so that the communication device transmits the logged second MBSFN measurement results to the network controller according to the second request command.

19. The network controller as claimed in claim 15, wherein the first MBSFN measurement results or the second MBSFN measurement results comprises at least one of a RSRP measured in at least one of MBSFN subframes, a RSRQ measured the at least one of MBSFN subframes, a signalingBLER-Result, a dataBLER-MCH-Result, and a MBSFN Area ID.

20. The network controller as claimed in claim 15, wherein the first MBSFN measurement results or the second MBSFN measurement results comprises at least one of an absoluteTimeStamp-r10, a traceReference-r10, a tce-Id-r10, a locationInfo-r10, a relativeTimeStamp-r10, a servCellIdentity-r10, a measResultServCell-r10, a measResultNeighCells-r10, and a measResultListEUTRA-v1090.

* * * * *